(12) United States Patent
Lorenz

(10) Patent No.: US 6,736,026 B2
(45) Date of Patent: May 18, 2004

(54) STEERING WHEEL

(75) Inventor: Christian Lorenz, Leidersbach (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 10/436,952

(22) Filed: May 13, 2003

(65) Prior Publication Data

US 2003/0192396 A1 Oct. 16, 2003

Related U.S. Application Data

(62) Division of application No. 09/954,671, filed on Sep. 17, 2001, now abandoned.

(30) Foreign Application Priority Data

Sep. 26, 2000 (DE) .................................. 200 16 639 U

(51) Int. Cl.$^7$ ................................................. G05G 1/10
(52) U.S. Cl. ......................................................... 74/552
(58) Field of Search ................ 24/552, 558; D12/176; 29/894.1; 280/731

(56) References Cited

U.S. PATENT DOCUMENTS

| | | | |
|---|---|---|---|
| 1,984,033 A | * | 12/1934 | Ritchie ........................ 74/557 |
| 2,298,596 A | | 10/1942 | Schrantz |
| 3,726,152 A | | 4/1973 | Tsuneizumi |
| 4,421,181 A | | 12/1983 | Andersson et al. |
| 4,468,978 A | * | 9/1984 | Takahara et al. ............... 74/552 |
| 4,800,775 A | | 1/1989 | Iuchi |
| 5,207,713 A | | 5/1993 | Park |
| 5,445,048 A | | 8/1995 | Kaufer et al. |
| 6,012,354 A | * | 1/2000 | Futschik et al. ............... 74/558 |
| 6,164,691 A | | 12/2000 | Hofer et al. |
| 6,282,982 B1 | | 9/2001 | Testa |
| 6,386,063 B1 | | 5/2002 | Hayashi et al. |
| 6,386,579 B1 | | 5/2002 | Reidy et al. |

FOREIGN PATENT DOCUMENTS

| | | | |
|---|---|---|---|
| DE | 4039138 | 2/1992 | |
| DE | 40 39 138 C1 * | 2/1992 | .................. 74/552 |
| DE | 19833333 | 1/2000 | |
| GB | 1043404 * | 9/1966 | .................. 74/552 |
| JP | 59-11963 | 1/1984 | |
| JP | 3-112772 | 5/1991 | |
| WO | WO92/01596 | 2/1992 | |

* cited by examiner

Primary Examiner—Vinh T. Luong
(74) Attorney, Agent, or Firm—Tarolli, Sundheim, Covell & Tummino L.L.P.

(57) ABSTRACT

A steering wheel comprises a rim skeleton and a rim casing. At least one vibration-damping element is provided which is arranged between the rim skeleton and the rim casing.

1 Claim, 1 Drawing Sheet

STEERING WHEEL

This is a divisional application and the assignment document for the parent application Ser. No. 09/954,671 was filed on Sep. 17, 2001 now abandoned.

TECHNICAL FIELD

The invention relates to a steering wheel.

BACKGROUND OF THE INVENTION

To increase the comfort, various attempts have been made recently to keep vibrations away from the steering wheel of a vehicle, which occur whilst the vehicle is in operation. It is known, for example, to use inertial masses to compensate vibrations, by which the resonance frequency of the steering wheel is shifted into a non-critical range. These inertial masses can either be additional masses or suitably arranged components of, for example, gas bag restraint systems, in particular the gas generator. If additional masses are used, this leads to additional costs and to an increased weight. If components of the gas bag restraint system are used, various problems arise, such as the gas tightness of the gas generators or the transmission of reaction forces on activation of the gas bag.

BRIEF SUMMARY OF THE INVENTION

The object of the invention consists in achieving a neutralizing of vibrations of the steering wheel with a small expenditure.

This is achieved in a steering wheel which comprises a rim skeleton and a rim casing, at least one vibration-damping element being provided which is arranged between the rim skeleton and the rim casing. The invention is based on the fundamental idea of neutralizing in terms of vibration technology only that part of the steering wheel for which this is absolutely necessary. This is the rim casing which comes into contact with the hands of the driver of the vehicle concerned. If the rim casing is neutralized in terms of vibration technology, vibrations of the remaining parts of the steering wheel, for example the steering wheel hub or the steering wheel spokes, are scarcely noticed. A further advantage of the construction according to the invention consists in that through the neutralizing merely of the rim casing, only a smaller vibrating mass has to be neutralized.

Advantageous developments of the invention will be apparent from the sub-claims.

DETAILED DESCRIPTION OF THE PREFERRED EMBODIMENTS

Figure 1:
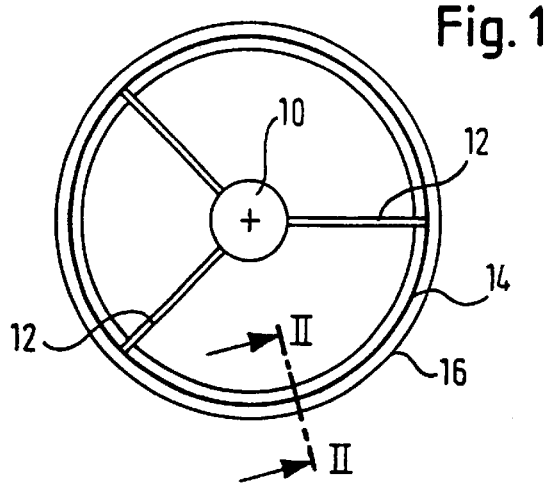
FIG. 1 shows a steering wheel in a diagrammatic view.

In FIG. 1 a steering wheel is illustrated diagrammatically. It contains a steering wheel hub 10, several spokes 12 and a rim skeleton 14. On the rim skeleton 14 a rim casing 16 is arranged, which is grasped by the driver of a vehicle equipped with the steering wheel.

Figure 2:
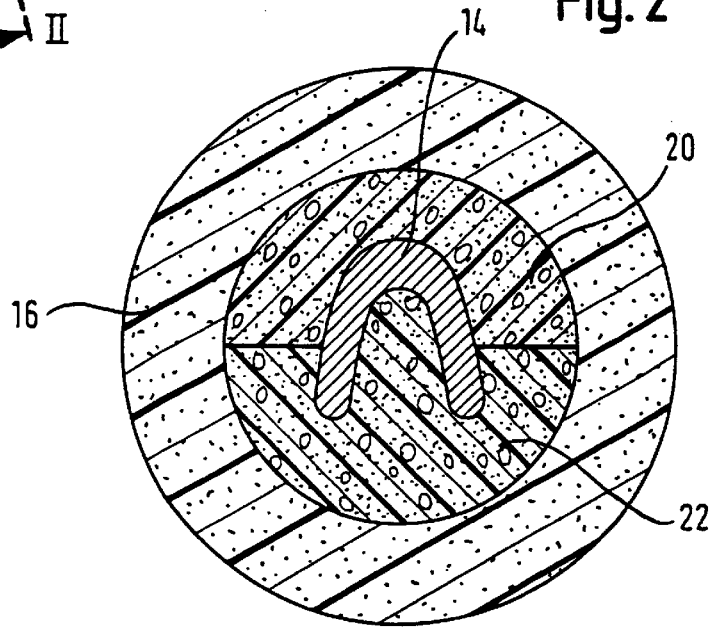
FIG. 2 shows in a sectional view a steering wheel according to a first embodiment of the invention.

In FIG. 2 a cross-section is shown through the rim skeleton and the rim casing of a steering wheel according to a first embodiment. The rim skeleton 14 is constructed here with a U-shaped cross-section which is completely surrounded by a vibration-damping element 20, 22. The vibration-damping element consists of a vibration-damping material, preferably of polyurethane foam, and is constructed in two parts, namely with an upper part 20 and a lower part 22. The upper part 20 and the lower part 22 together produce a circular cross-section.

On the vibration-damping element 20, 22 the rim casing 16 is arranged, which consists of a shell having an annular cross-section and is foamed onto the vibration-damping element. Owing to the elastic characteristics of the vibration-damping element 20, 22, the rim casing 16 is mounted on the rim skeleton 14 in a vibration-free manner or at least in a damped manner with respect to vibrations.

Figure 3:
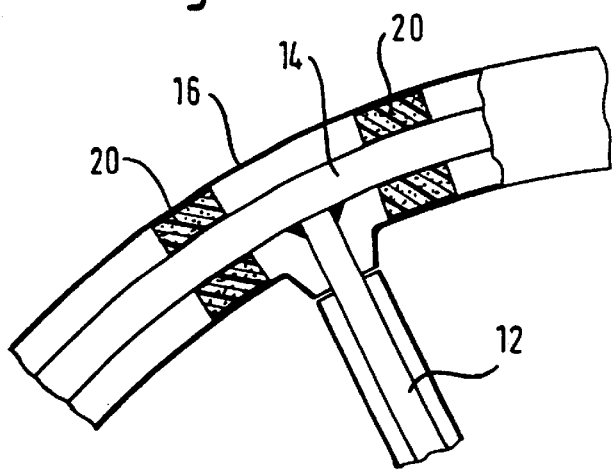
FIG. 3 shows in a sectional view a steering wheel according to a second embodiment of the invention.

In FIG. 3 a section is shown through a steering wheel according to a second embodiment. In contrast to the first embodiment, here several rings 20 are used as vibration-damping element, which in contrast to the continuous insert known from the first embodiment are arranged spaced apart from each other, and which locally support the rim casing. Between the vibration-damping rings 20 there is a free space between the rim skeleton 14 and the rim casing 16. In the second embodiment the rim casing 16 consists of an upper shell and a lower shell which are placed onto the vibration-damping rings and are connected with each other to form the rim casing.

What is claimed is:

1. A steering wheel comprising:
   a rim skeleton,
   a rim casing, and
   vibration-damping elements arranged between said rim skeleton and said rim casing, said vibration-damping elements comprising rings of one of vibration-damping material and composite material, said rings being arranged spaced apart from each other on said rim skeleton and supporting said rim casing such that, between adjacent vibration-damping rings, a free space is defined by said rim skeleton and said rim casing.

* * * * *